United States Patent [19]

Dietrick

[11] 4,015,369
[45] Apr. 5, 1977

[54] DEVICE FOR REMOVING WATER FROM HYDRAULIC FLUID

[76] Inventor: Gerald P. Dietrick, 523 Ridgeview Drive, Florence, Ky. 41042

[22] Filed: Dec. 16, 1975

[21] Appl. No.: 641,250

[52] U.S. Cl. .................................. 51/2 R; 51/267; 159/15; 210/167
[51] Int. Cl.² .................. B24B 55/02; B01D 1/00
[58] Field of Search ............... 51/267, 2 R, 262 R, 51/356; 210/167, 171, 180; 159/15; 208/179, 184, 187

[56] References Cited

UNITED STATES PATENTS

| | | | |
|---|---|---|---|
| 1,452,253 | 4/1923 | Nevitt .................................. | 159/15 |
| 2,073,026 | 3/1937 | Renfrew ............................... | 159/15 |
| 2,174,265 | 9/1939 | Holt ................................. | 210/184 X |
| 2,210,926 | 8/1940 | Hickman .............................. | 159/15 |
| 2,396,664 | 3/1946 | Ladd .................................. | 159/15 |
| 2,578,040 | 12/1951 | Booth et al. ......................... | 51/267 |
| 2,895,883 | 7/1959 | Hobson .............................. | 208/179 X |
| 3,265,212 | 9/1966 | Bonsall .............................. | 210/167 |

*Primary Examiner*—Al Lawrence Smith
*Assistant Examiner*—Nicholas P. Godici
*Attorney, Agent, or Firm*—James W. Pearce; Roy F. Schaeperklaus

[57] ABSTRACT

A device for removing water from hydraulic fluid of a machine tool having a coolant system. The hydraulic fluid is passed through a tower to be exposed to a vacuum inside the tower. A first jet ejector is powered by coolant from a coolant circulating pump and draws a vacuum on an upper portion of the tower. A second jet ejector is powered by hydraulic fluid from a hydraulic fluid circulating pump and draws hydraulic fluid from a lower end of the tower. The ejectors impress a vacuum on the interior of the tower to cause vaporization of water carried by the hydraulic fluid and the water is returned to the coolant system through the first ejector.

7 Claims, 5 Drawing Figures

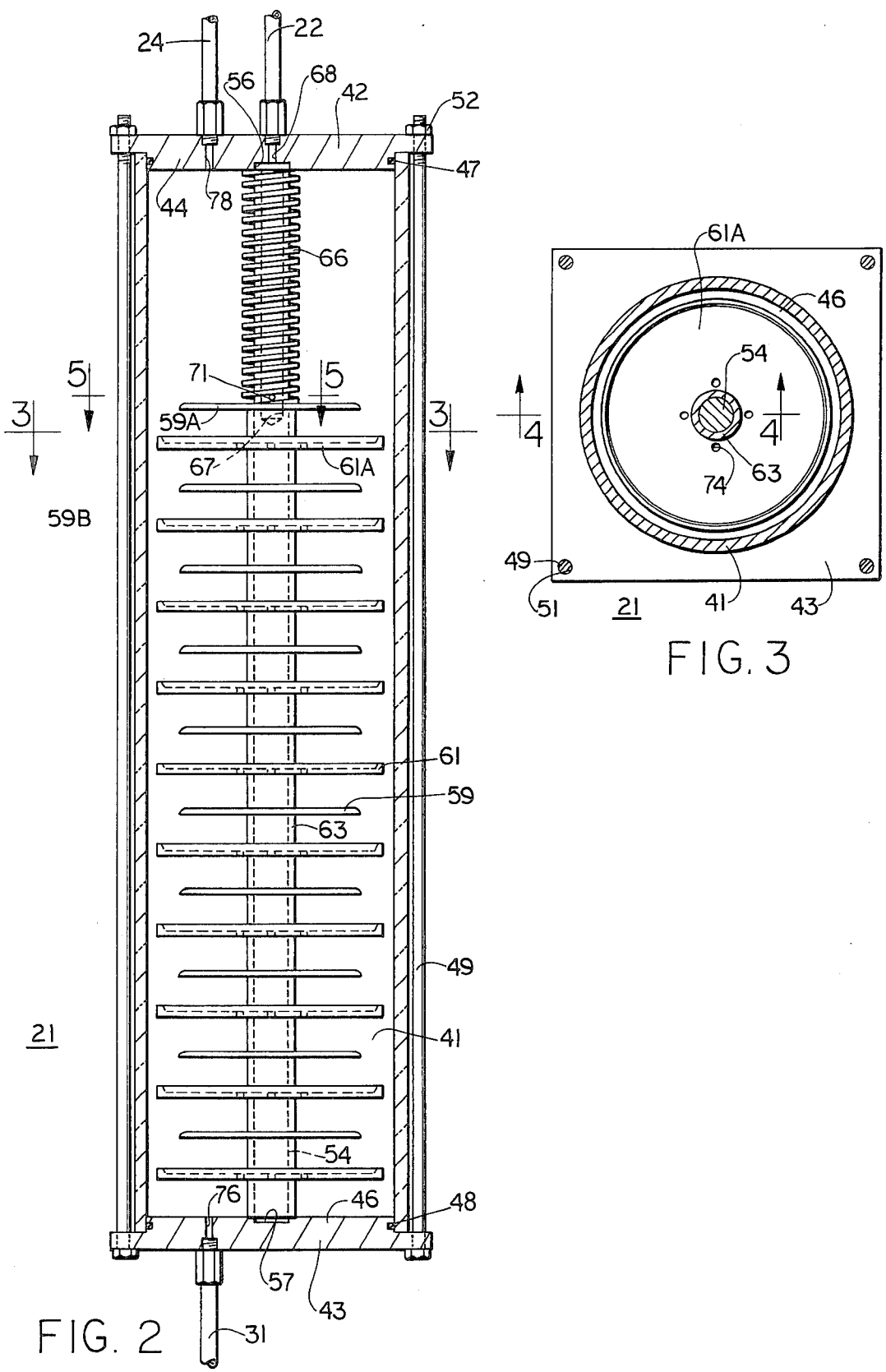

4,015,369

DEVICE FOR REMOVING WATER FROM HYDRAULIC FLUID

This invention relates to machine tools. More particularly, this invention relates to a machine tool which includes hydraulic controls and also employs an aqueous coolant and to a method and apparatus for separating water of the coolant from fluid of the hydraulic system.

In such a machine tool, it is not possible to totally isolate the hydraulic system from the coolant, and small portions of water from the coolant can enter the hydraulic system causing contamination of the hydraulic fluid reducing its effectiveness. Moisture cannot be removed from the hydraulic fluid by ordinary filters, and the presence of moisture in the hydraulic system reduces the effectiveness of filters in removing other contaminants from the hydraulic fluid.

An object of this invention is to provide a system for removing moisture from hydraulic fluid of a hydraulic system of a machine tool without removing the hydraulic fluid from the system.

In a hydraulic system, hydraulic fluid is normally at a temperature which is elevated because of the operation of the hydraulic system. A further object of this invention is to provide a tower through which the hydraulic fluid is passed and in which the hydraulic fluid or oil is subjected to a vacuum while passing through the tower in a thin layer so that the moisture can be removed from the hydraulic fluid at the temperatures at which the hydraulic fluid operates in the hydraulic system.

A further object of this invention is to provide such a tower in which the power for maintaining the vacuum is derived from pumps which pressurize the hydraulic fluid and coolant of the machine tool.

Briefly, this invention provides a separator tower for removing moisture from hydraulic fluid which includes a plurality of vertically spaced substantially horizontal plates inside an enclosure. The hydraulic fluid is directed over the plates with a thin layer of fluid being formed on each plate. A vacuum is impressed on the upper end of the tower by a first jet ejector which is powered by coolant from a pump which directs the coolant to the machine tool, and moisture which is removed from the upper portion of the tower is returned to the coolant system in the first jet ejector. A vacuum is impressed on the bottom of the tower by a second jet ejector which is powered by hydraulic fluid from a pump which directs the hydraulic fluid to the machine tool, and hydraulic fluid or oil is returned to the hydraulic system in the second jet ejector. The jet ejectors provide a sufficient vacuum in the tower that the moisture in the contaminated hydraulic fluid boils out of the fluid as the fluid crosses the plates of the tower. The plates are arranged in the tower in vertically spaced relation, and the hydraulic fluid progresses from plate to plate in a thin film on each plate.

The above and other objects and features of the invention will be apparent to those skilled in the art to which this invention pertains from the following detailed description and the drawings, in which:

FIG. 2 is a view in upright section of the water separating tower of the system shown in FIG. 1;

FIG. 3 is a view in section taken on the line 3—3 in FIG. 2;

In the following detailed description and the drawings, like reference characters indicate like parts.

Figure 1:
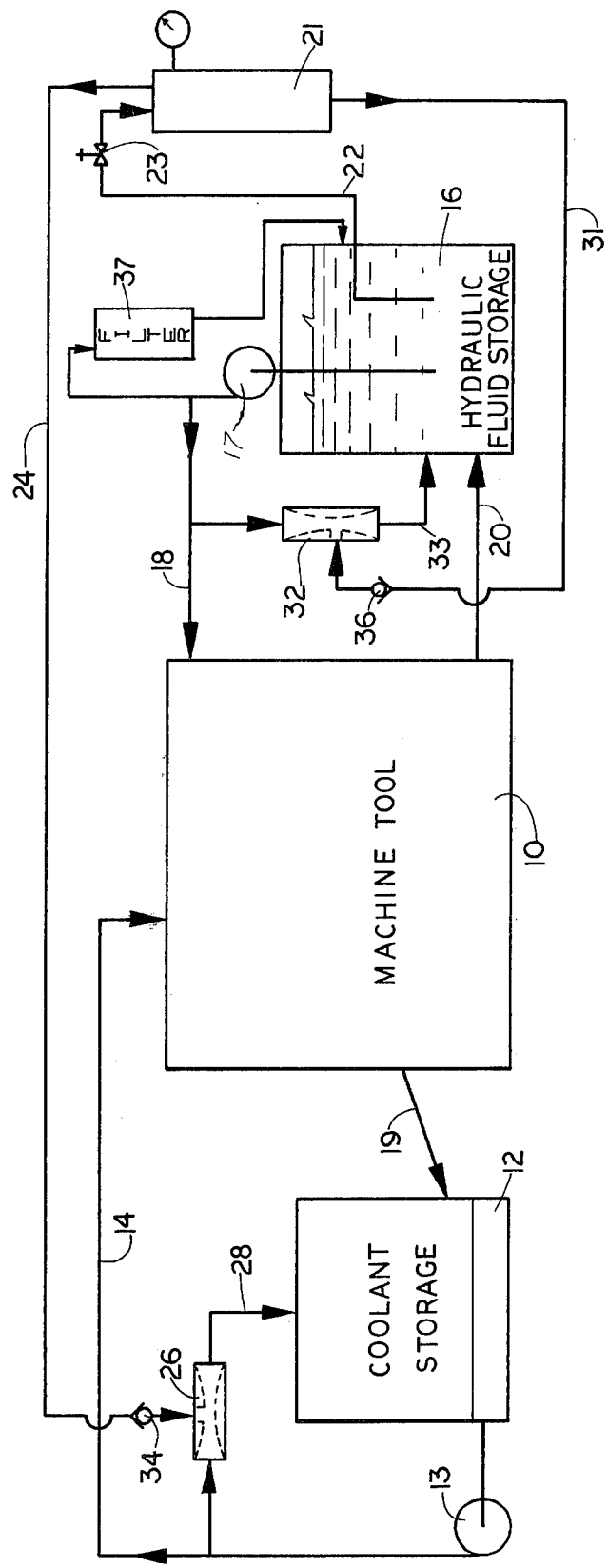
FIG. 1 is a schematic flow sheet showing a coolant system and a hydraulic system for a machine tool which embodies a water separating tower for hydraulic fluid constructed in accordance with an embodiment of this invention.
Figure 4:
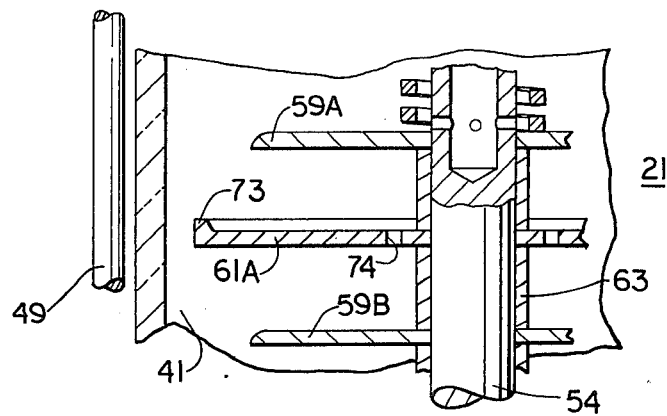
FIG. 4 is a view in section taken on an enlarged scale on the line 4—4 in FIG. 3.

In FIG. 1 is shown schematically a fluid flow system for a machine tool which includes a water separating tower 21 constructed in accordance with an embodiment of this invention. In the system shown in FIG. 1, a machine tool 10 is shown, which can be a conventional grinding machine. Coolant is directed to the machine tool 10 from a coolant storage tank 12 by a coolant pump 13 through a coolant delivery line 14. Hydraulic fluid is pumped from a hydraulic fluid storage tank 16 by a hydraulic fluid pump 17 through a hydraulic fluid delivery line 18 to the machine tool 10. The hydraulic fluid powers moving parts of the machine tool, and the coolant is directed to cool a workpiece (not shown) on which the machine tool works in the usual fashion. Coolant returns from the machine tool 10 to the coolant storage tank 12 through a line 19. Hydraulic fluid returns from the machine tool 10 to the hydraulic fluid storage tank 16 through a line 20.

The water separating tower 21 is connected to receive hydraulic fluid from the hydraulic fluid storge tank through a line 22 and a throttle valve 23. A vacuum is drawn on an upper portion of the tower 21 by a line 24 connected to a side arm of a jet ejector 26. The jet ejector 26 is powered by coolant from the coolant delivery line 14. The coolant is returned from the jet ejector 26 to the coolant storage tank 12 through a line 28. A vacuum is drawn on the lower portion of the tower 21 by a line 31 connected to a side arm of a jet ejector 32. The jet ejector 32 is powered by hydraulic fluid from the hydraulic fluid delivery line 18. The hydraulic fluid is returned from the jet ejector 32 to the hydraulic fluid storage tank 16 through a line 33. Check valves 34 and 36 in the lines 24 and 31, prevent back flow from the side arms of the jet ejectors 26 and 32, respectively. Hydraulic fluid from the line 18 can also be directed through a filter 37 for removing particulate material from the hydraulic fluid system.

Figure 5:
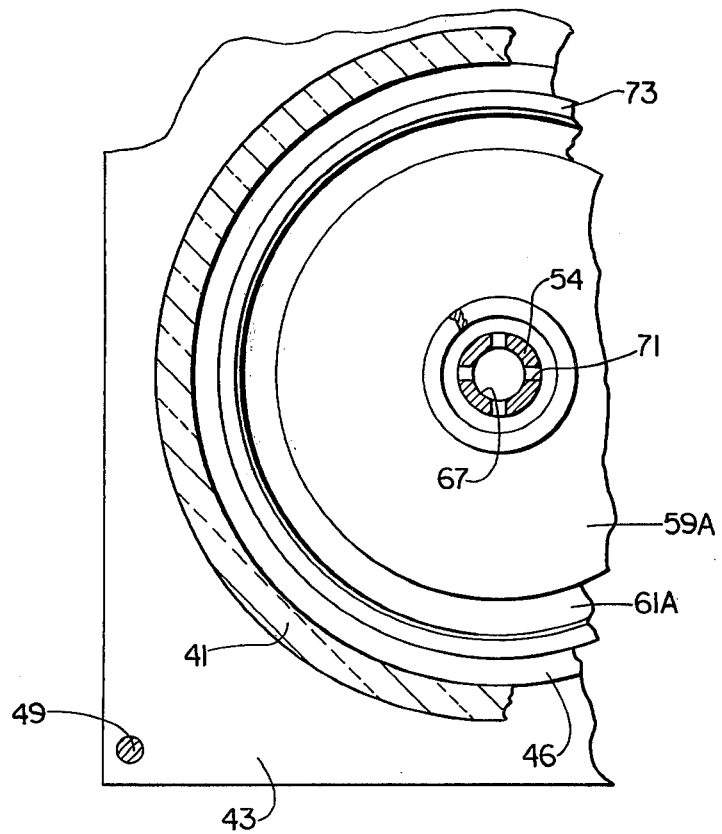
FIG. 5 is a view in section taken on an enlarged scale on the line 5—5 in FIG. 2.

Details of construction of the tower 21 are shown in FIGS. 2 and 3. The tower 21 includes a tubular body 41 and end plates 42 and 43. Bosses 44 and 46 on the end plates 42 and 43 extend into end portions of the body 41 and are sealed thereto by O-rings seals 47 and 48, respectively. Bolts 49 extend through openings 51 (FIG. 3) in the plates 42 and 43. Nuts 52 (FIG. 2) on the bolts 49 engage the end plate 42 to hold the end plates 42 and 43 and the body 41 in assembled relation. The body 41 can be formed of a transparent plastic resin such as an acrylic resin or of glass or other transparent material so that the interior thereof can be viewed. An upright rod 54 is mounted in axial sockets 56 and 57 in the bosses 44 and 46, respectively. On the rod 54 are mounted a plurality of flat plates 59 and a plurality of edged plates 61. The flat plates 59 and the edged plates 61 alternate along the rod 54. Ring shaped spacers 63 hold the plates 59 and 61 in spaced relation. A compression spring 66 bears on the boss 44 and on the uppermost flat plate 59A to hold the plates 59 and 61 and the spacers 63 in position on the rod 54. An axial socket 67 in the upper portion of the rod 54 communicates with a port 68 in the end plate 42 to which the line 22 is connected. Hydraulic fluid enters the tower 21 through line 22 and the port 68 and moves down the socket 67 to be discharged through radial ports 71 (FIG. 5) onto the uppermost flat plate 59A. The hydraulic fluid advances outwardly of the flat plate 59A in a thin layer and is discharged over the outer edge of the flat plate 59A onto the uppermost edged plate 61A.

The hydraulic fluid progresses inwardly across the upper edged plate 61A. An edge flange 73 on the edged plate 61A directs the fluid inwardly. The fluid is discharged from the edged plate 61A downwardly through openings 74 (FIG. 3) therein and falls to the next lower flat plate 59B and progresses downwardly through the tower 21 to the lower end plate 43 (FIG. 2) with a large area of fluid exposed inside the tower and the fluid progressing across the plates 59 and 61 in thin layers. The hydraulic fluid is withdrawn through a port 76 in the lower end plate 43 to which the line 31 is connected. A vacuum is impressed on the upper portion of the tower 21 through a port 78 in the upper end plate 42 to which the line 24 is connected.

In the operation of the machine tool 10 (FIG. 1) hydraulic fluid is heated to a temperature of over 100° F. The ejectors 26 and 32 impress a high vacuum on the interior of the tower 21 so that the absolute pressure inside the tower 21 can be approximately 1 psi absolute, and, at that temperature and pressure, any water in the hydraulic fluid is rapidly vaporized. The interior of the tower can be viewed through the transparent body 41 so that the vaporizing of water from the hydraulic fluid can be observed. Water entrained in the hydraulic fluid or oil vaporizes as the oil passes downwardly and is exposed on the distributor plates 59 and 61. The water removal becomes evident when the oil system heats up to about 100° F., and the water removal is more efficient as the temperature of the oil rises above 100° F. The water is returned to the coolant through the ejector 26, and the hydraulic fluid is returned to the hydraulic system after being freed of water through the ejector 32. The throttle valve 23 is adjusted so that the rate of flow of hydraulic fluid to the tower 21 is just insufficient to cause build up of hydraulic fluid in the tower, and the lower end plate 43 carries only a thin layer of hydraulic fluid.

The water separating tower and system illustrated in the drawings and described above are subject to modification without departing from the spirit and scope of the appended claims.

Having described my invention, what I claim as new and desire to secure by letters patent is:

1. In combination with a machine tool having a coolant system, a hydraulic system, a pump for circulating coolant and a pump for circulating hydraulic fluid, a device for separating water from the hydraulic fluid which comprises a tower, means for directing hydraulic fluid to said tower to be exposed inside the tower, a first jet ejector powered by coolant from the coolant circulating pump, a second jet ejector powered by hydraulic fluid from the hydraulic fluid circulating pump, there being a first port in a lower portion of the tower for removing hydraulic fluid from the tower, means connecting the first port to a side arm of the second ejector, there being a second port in an upper portion of the tower for removing vapor from the tower, means connecting the second port to a side arm of the first ejector, the ejectors impressing a vacuum on the interior of the tower to cause vaporization of water carried by the hydraulic fluid, the water being returned to the coolant system through the first ejector.

2. A combination as in claim 1 which includes a hydraulic fluid storage tank, the means for directing hydraulic fluid to the tower being a line connecting the fluid storage tank to the tower, and throttle valve means in said line for controlling the rate at which hydraulic fluid is drawn from the hydraulic fluid storage tank into the tower.

3. In combination with a machine tool having a hydraulic system and a pump for circulating hydraulic fluid, a device for separating water from the hydraulic fluid which comprises a tower, means for directing hydraulic fluid to said tower to be exposed inside the tower, a first jet ejector, means powering the first jet ejector, a second jet ejector powered by hydraulic fluid from the hydraulic fluid circulating pump, there being a first port in a lower portion of the tower for removing hydraulic fluid from the tower, means connecting the first port to a side arm of the second ejector, there being a second port in an upper portion of the tower for removing vapor from the tower, and means connecting the second port to a side arm of the first ejector, the ejectors impressing a vacuum on the interior of the tower to cause vaporization of water carried by the hydraulic fluid, the water being removed through the first ejector.

4. A combination as in claim 3 which includes a hydraulic fluid storage tank, the means for directing hydraulic fluid to the tower being a line connecting the fluid storage tank to the tower, and throttle valve means in said line for controlling the rate at which hydraulic fluid is drawn from the hydraulic fluid storage tank into the tower.

5. A combination as in claim 3 wherein the tower comprises an enclosed chamber, an upright rod in the chamber, a plurality of vertically spaced substantially horizontal plates mounted on said rod, alternate first edged plates being each provided with an upright opening adjacent the rod and an upwardly extending peripheral flange directing fluid to flow inwardly thereon, alternate second plates being each provided with an outer edge above the next lower edged plate so that hydraulic fluid moves outwardly of the second plates and flows over edges thereof, the means for directing fluid into the tower discharging the fluid onto an uppermost one of the plates, the fluid progressing downwardly of the tower and across each of the plates in a thin sheet.

6. A tower for removing water from hydraulic fluid which comprises an enclosed chamber, an upright stationary rod in the chamber, a plurality of vertically spaced substantially horizontal plates mounted on the rod, means for directing the fluid to flow crosswise of each of the plates in a thin film and downwardly from plate to plate, means for impressing a vacuum on an upper end portion of the chamber to cause water entrained in the hydraulic fluid on the plates to vaporize and to remove the water from the chamber, and means for removing the hydraulic fluid from a lower end portion of the chamber.

7. A tower as in claim 6 wherein the plates include alternate edged first plates and alternate second plates, each of the edged first plates includes an upwardly extending peripheral flange at an outer edge of a substantially horizontal main portion directing fluid to flow inwardly thereon and an upright opening overlying the next lower second plate, each of the second plates having an outer edge overlying the main portion of the next lower edged plate so that hydraulic fluid flows outwardly over the edge of each second plate.

* * * * *